Aug. 2, 1966
R. H. KROEMER, JR
3,263,776
FOOD SERVICE SYSTEM
Filed Jan. 8, 1965
5 Sheets-Sheet 2
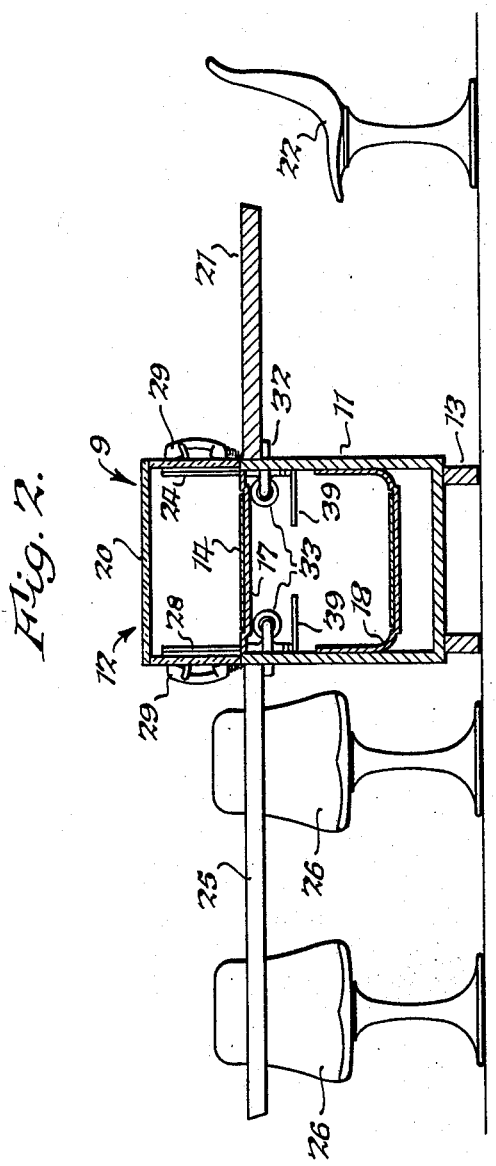
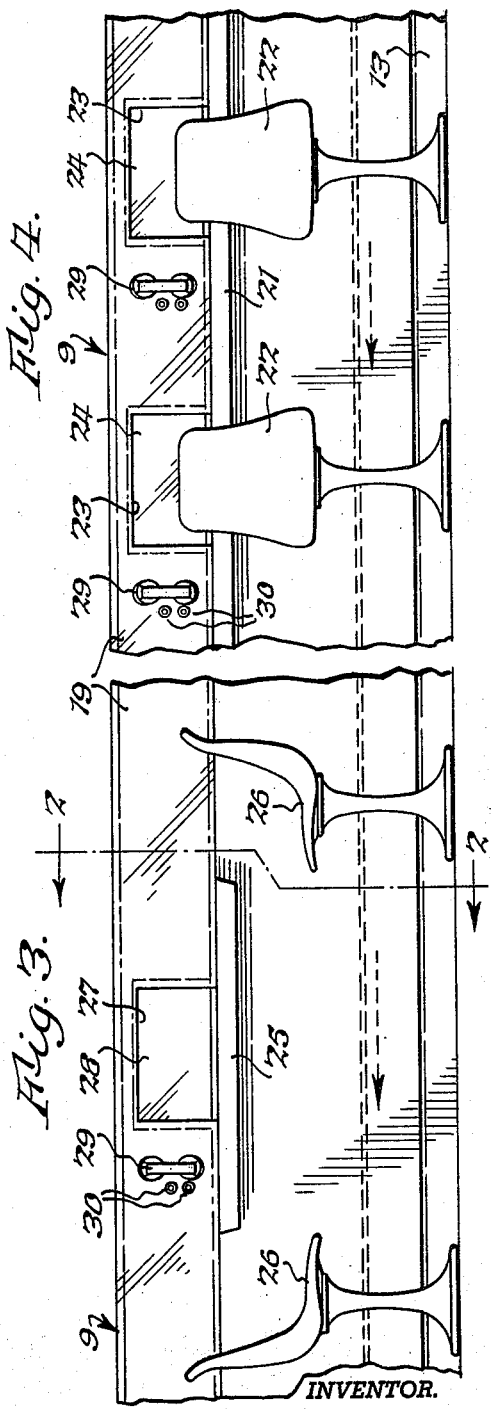
INVENTOR.
Robert H. Kroemer, Jr.
BY
Christel & Bean
ATTORNEYS.

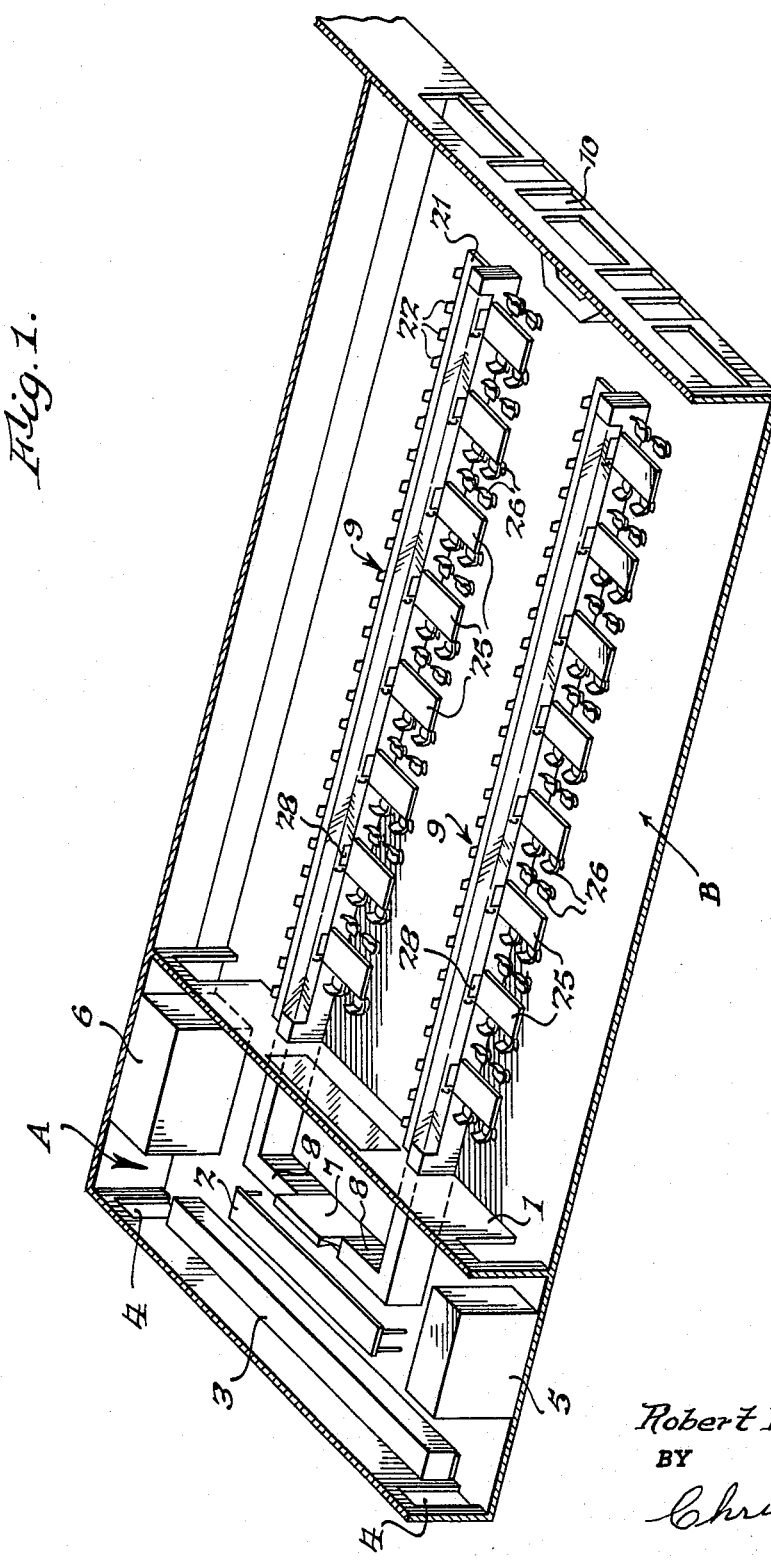

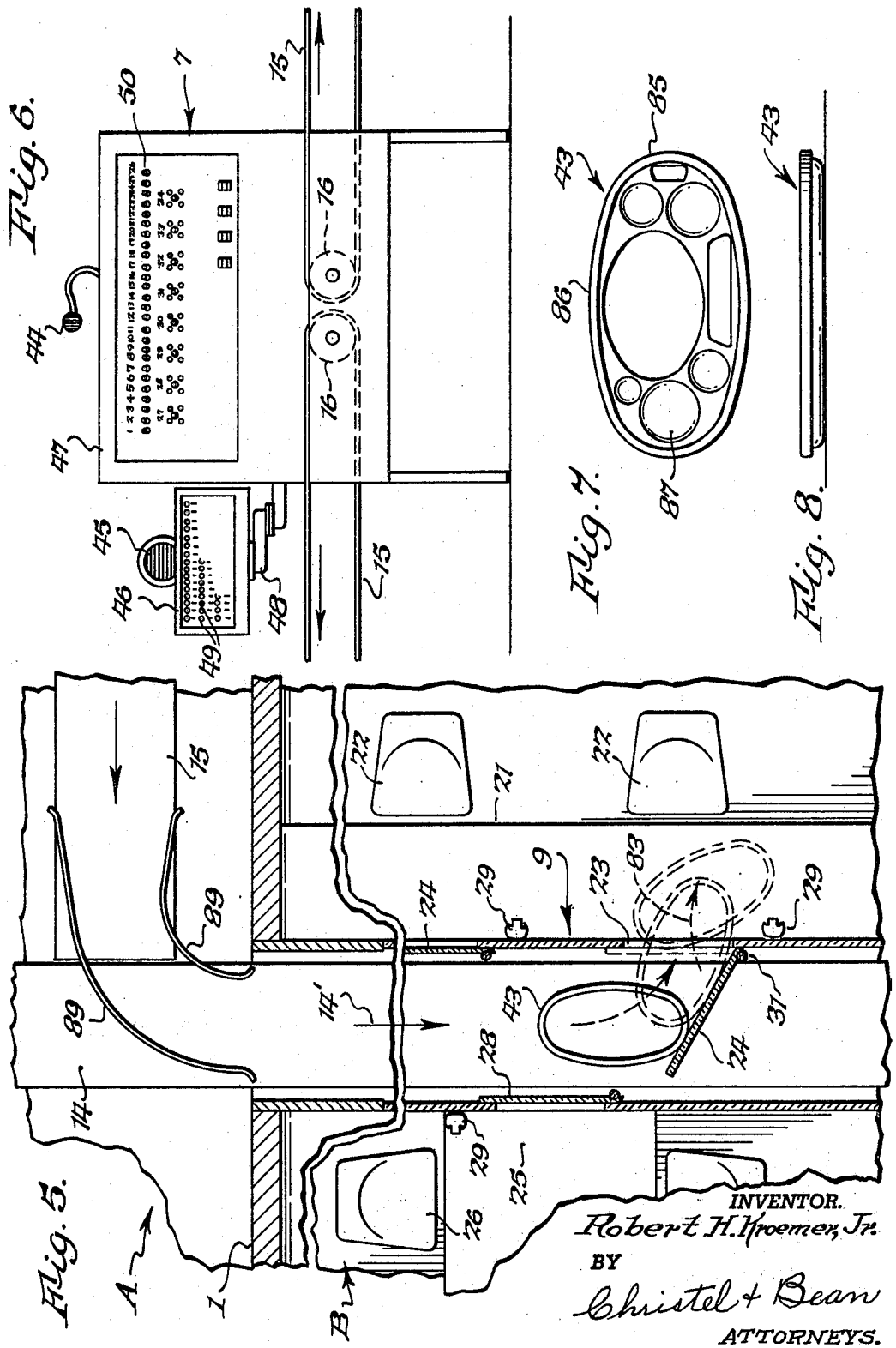

Aug. 2, 1966  R. H. KROEMER, JR  3,263,776
FOOD SERVICE SYSTEM
Filed Jan. 8, 1965  5 Sheets-Sheet 4
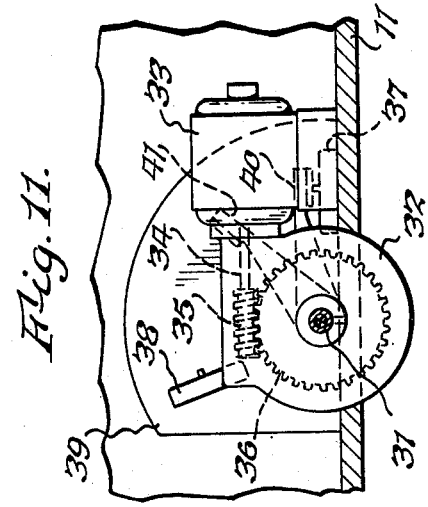
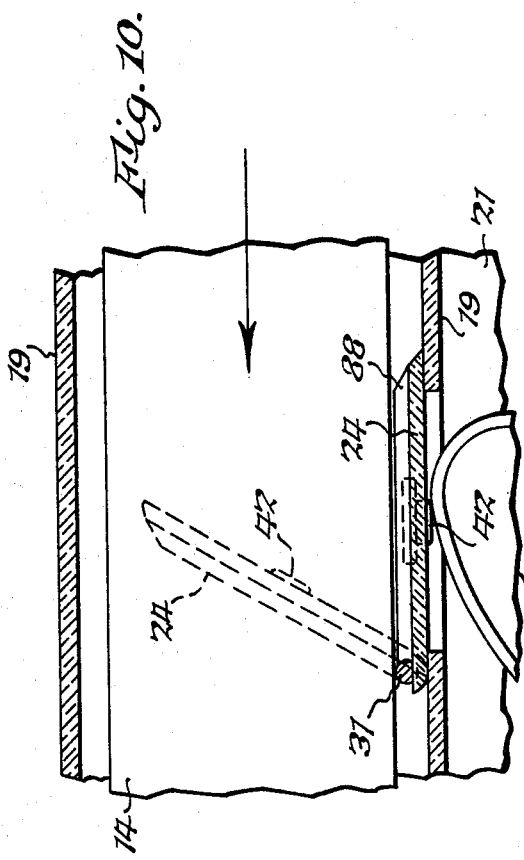
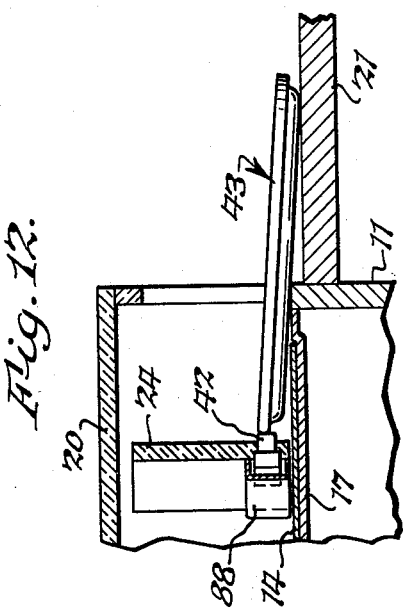
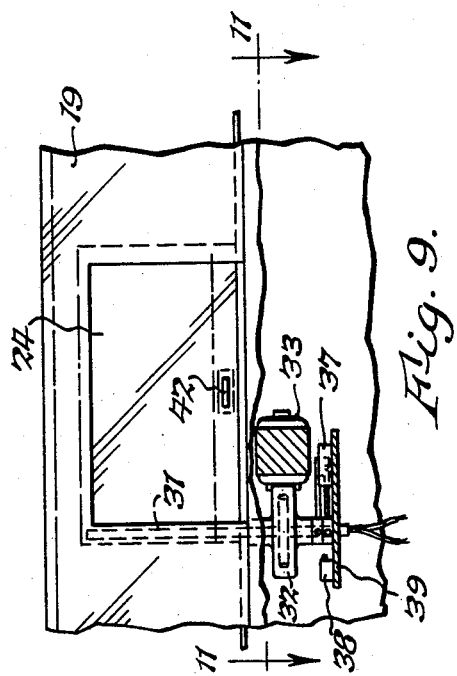
INVENTOR.
Robert H. Kroemer, Jr.
BY Christel & Bean
ATTORNEYS.

INVENTOR.
Robert H. Kroemer, Jr.
BY
Christel + Bean
ATTORNEYS.

United States Patent Office 3,263,776
Patented August 2, 1966

3,263,776
FOOD SERVICE SYSTEM
Robert H. Kroemer, Jr., 25 Hill Terrace, Henrietta, N.Y.
Filed Jan. 8, 1965, Ser. No. 424,229
9 Claims. (Cl. 186—1)

This invention relates to a new and useful food service system for restaurants and the like.

A significant factor in the cost of eating at a typical restaurant is the cost of serving the food. Conventionally, food is brought from the kitchen to the dining area by waiters and waitresses who provide individual, personal service to the diner. While this type of service can add a great deal to the pleasure of dining out, many diners do not require such personal service and attention and would prefer to avoid the relatively high labor cost involved. Therefore, many people resort to cafeterias and other self-service establishments.

However, many people willing to forego personal service nonetheless do not like to stand in line, cafeteria style, to select their meal and then carry a tray to a table.

Therefore, the primary object of my invention is to provide a food service system which will enable a customer seated at a counter or table to place his order, and which will serve the ordered meal to the customer, without requiring waiter personnel and without requiring the customer to leave his seat.

Another object of my invention is to provide the foregoing in a rugged, durable and dependable food service system which is both practical and esthetically acceptable.

In one aspect thereof, a food service system constructed in accordance with my invention is characterized by the provision of a conveyor extending from a food dispatch area to a customer service area for conveying dishes of food from the former to the latter, and means for transferring the food dishes from the conveyor to a table at the service area, the transfer means including an interceptor member mounted for movement into and out of a dish or tray intercepting position relative to the conveyor, drive means for so moving the interceptor member, first drive control means actuated from the dispatch area for moving the interceptor member into its dish intercepting position, and second drive control means responsive to engagement of the interceptor member by a dish on the conveyor for moving the interceptor member out of its intercepting position, the member moving the intercepted dish from the conveyor onto the table during such movement out of its intercepting position.

The foregoing and other objects, advantages and characterizing features of a food services system of my invention will become clearly apparent from the ensuing detailed description of an illustrative embodiment thereof, considered in conjunction with the accompanying drawings depicting the same wherein like reference numerals denote like parts throughout the various views and wherein:

FIG. 1 is a perspective view of the interior of a restaurant incorporating a food service system of my invention;

FIG. 2 is a transverse sectional view through one of the customer service station groups thereof, on an enlarged scale, taken about on line 2—2 of FIG. 3;

FIGS. 3 and 4 are fragmentary, opposite side elevational views of a customer service station grouping;

FIG. 5 is a fragmentary, horizontal sectional view of a set of dispatch and service conveyors, the customer service portion being broken away for ease of illustration;

FIG. 6 is a front elevational view of the dispatch station, showing portions of the lateral dispatch conveyors leading to the customer service conveyors;

FIGS. 7 and 8 are top plan and side elevational views, respectively, of food tray or dish especially adapted for use with the system of my invention;

FIG. 9 is a fragmentary detail view, partly in side elevation and partly in vertical section, showing an interceptor member in closed position, and the actuating motor therefor;

FIG. 10 is a fragmentary horizontal sectional view through the conveyor enclosure, indicating in broken lines the intercept position of the interceptor member and showing in solid lines the interceptor member after it has moved to closed position, transferring the food tray from the conveyor to the counter or table;

FIG. 11 is a fragmentary, detail sectional view taken about on line 11—11 of FIG. 9;

FIG. 12 is a fragmentary, vertical sectional view showing the interceptor member as it appears in a partially closed position, the food dish or tray being partially transferred thereby from the conveyor to the counter or table.

Figure 13:
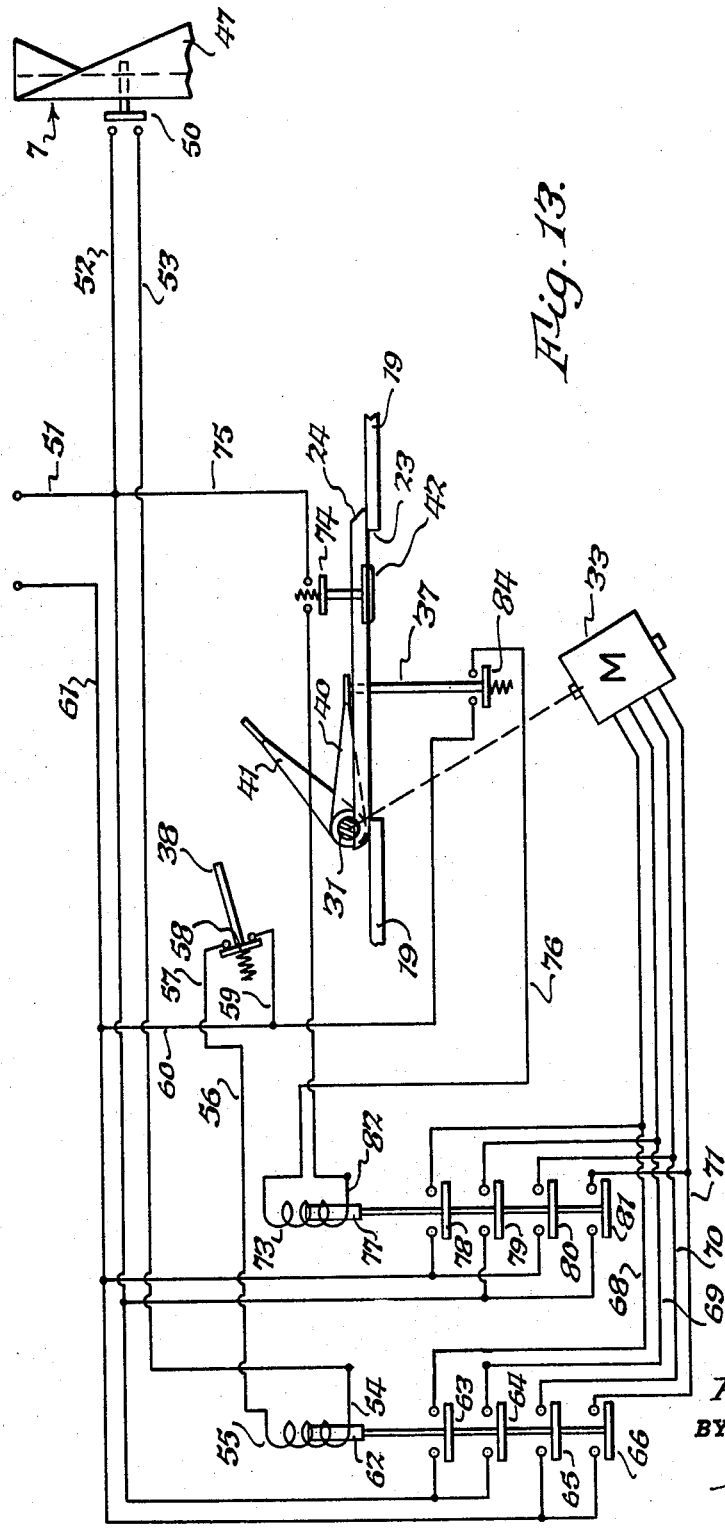
FIG. 13 is a schematic wiring diagram of an interceptor drive control system.

Referring now in detail to the illustrative embodiment as depicted in the accompanying drawings, there is shown in FIG. 1 a restaurant divided by a wall 1 into a work area A and a customer service area B. In the work area A there can be provided a table 2 for assembling food orders, the individual food items being selected from a table 3 which can comprise a pair of conveyors moving inwardly toward the center from doorways 4 leading for example to a kitchen area. Refrigeration and storage units can be provided, as indicated at 5, and lockers, washrooms or the like can be provided at 6. A dispatch station is indicated at 7, and transfer conveyors indicated at 8 are provided for delivery of food dishes from dispatch station 7 to a pair of customer service station groupings generally designated 9 extending from wall 1 into the customer service area B. It will be appreciated that entrance and exit doorways 10, windows and the like also will be provided.

Referring now to FIGS. 2, 3 and 4 each customer service station grouping 9 includes an elongated base 11 extending into area B from wall 1 and surmounted by a transparent, inverted generally U-shaped enclosure 12. Base 11 can be of any desired construction containing, for example, access panels and other details not shown, and is mounted on the floor or other supporting surface by an inset supporting base 13. An endless belt conveyor 14 extends from work area A through wall 1 the length of each station grouping 9, being supported at one end by a drive roll and at its opposite end by an idler roll which are not shown because such endless belt conveyor drives and supports are well known. For example, conveyor belts 14 would be supported at each end in the same manner as the endless belts 15 (FIG. 5) in conveyors 8, which belts 15 have their upper conveying flights moving in opposite directions away from dispatch station 7 and are supported at opposite ends by idler and drive rolls, as indicated for example at 16 in FIG. 6.

The upper conveying flights of belts 14 are supported by plates 17 extending across the upper end of each base 11, which plates are recessed to receive the belt in flush relation with the edges of the plates. The return flights of the conveyor belts 14 are supported by plates 18 extending across bases 11 adjacent the lower ends thereof. Enclosures 12 comprise opposite side walls 19 and a top wall 20 of Plexiglas or other transparent material enabling the customers to see through the enclosures to the conveyors and to the food dishes being conveyed thereby.

In the illustrated embodiment, a counter 21 is provided at one side of each station grouping 9, extending the full length thereof, and individual chairs 22 are provided at spaced points therealong in the manner of counter stools. The adjacent enclosure wall 19 is provided with a series of service ports or openings 23 therethrough, directly in front of each chair 22, which openings are normally closed by interceptor door members 24. A series of tables 25 is provided on the opposite side of each station grouping 9, the tables being located at spaced points therealong with chairs 26 arranged on opposite sides of each table. Service ports or openings 27 are provided through the adjacent enclosure side 19 at each table 25, which ports are normally closed by interceptor door members 28.

A telephone 29 is provided adjacent each individual service area or station, beside each service opening 23, 27 for calling in an order to the dispatcher at station 7. Signal lights 30 are positioned at each individual station, to indicate when the telephone connection to the dispatcher is completed and also to indicate when the order has been dispatched to the customer. The telephone circuits, and energizing circuits for lights 30 are conventional, per se, and the details thereof are omitted for greater clarity and ease of illustration.

It is a particular feature of my invention that service doors 24 and 28 are arranged to intercept a dish or tray 43 on conveyor 14 and to transfer the dish from the conveyor belt 14 to the counter 21 or table 25, as the case may be, as shown in FIG. 5. To this end, each door 24, 28 is pivotally supported at one side on a vertical shaft 31 journaled in a bearing structure including a gear housing 32 (FIGS. 9 and 11) mounted in base 11 by appropriate means. A reversible drive motor 33 is mounted on the wall of the base 11, adjacent each individual service station, having a rotary output shaft 34 driving a worm 35 engaging a gear 36 connected to shaft 31 for rotation therewith. A pair of switches 37, 38 are mounted on a switch plate 39 carried by the sidewall of base 11, for engagement by switch actuating arms 40 and 41, respectively, which are mounted on shaft 31 for rotation therewith. Another switch 42 is mounted on each door 24, 28 for movement therewith, being mounted in a position to be engaged by the food dish on conveyor belt 14.

In operation, a customer seated at any of the tables 25, or at any station along either counter 21, picks up the adjacent telephone 29 and calls in his order to the dispatcher at the dispatch station 7. The dispatch station (FIG. 6) is provided with a microphone 44 and a loudspeaker 45 enabling the dispatcher to talk to the individual customers through their telephones 29, and also enabling him to talk to others in the kitchen and work areas.

A console 46, mounted on a larger, floor mounted console 47 through an articulated supporting arm 48, contains appropriate switches and signal lights enabling the dispatcher to locate and connect in the individual telephones 29. A completed connection can be indicated by one of the signal lights 30.

On receiving an order, the dispatcher will have it filled by personnel in work area A. Thus, individual trays 43 are prepared on table 2 with selected food items from conveyors 3. When the particular order is ready, the dispatcher places it on the conveyor belt 15 traveling toward the appropriate customer service group 9, and actuates an appropriate switch 50 on console 47 associated with the individual station from which the order was placed.

Energization of any of the switches 50 at the dispatch station completes an energizing circuit to the individual station light 30, indicating that the order is on its way. It also completes an energizing circuit from a suitable source to a door opening relay coil 55 (FIG. 13) via leads 51, 52, switch 50, leads 53 and 54, relay coil 55, leads 56, 57, normally closed contact 58 of switch 38, and leads 59, 60 and 61. Energization of relay coil 55 attracts its armature 62, closing contacts 63, 64, 65 and 66. Switches 63–66 complete energizing circuits via leads 68, 69, 70 and 71 to motor 33, causing it to swing door 24, or 28 as the case may be, in to its open, intercept position. Switch 37 is released, closing contact 84 as the door moves out of its closed position.

When door 24 or 28 reaches its intercept position as indicated in broken lines in FIG. 10, arm 41 actuates switch 38 openings its contact 58 to deenergize the drive motor control relay coil 55, stopping motor 33. The nonreversible worm drives of motors 33 hold the respective doors open, or closed as the case may be, upon stopping the motors. When dish 43 has been conveyed by belt 14 to the individual station from which the order was placed it will strike the open door 24 as illustrated in FIG. 5. The doors 24, 28 when in their intercept position extend obliquely across belt 14 far enough to intercept a dish 43 thereon and cam it toward the associated opening 23 or 27. Continued movement of belt 14 in the direction of the arrow 14' (FIG. 5) with dish 43 engaged against interceptor door member 24 causes the dish to be cammed toward the opening 23, as illustrated in FIG. 5.

In addition, as dish or tray 43 is cammed by the door toward the associated opening it strikes the door mounted switch 42, actuating it to close a contact 74 completing an energizing circuit to the door closing relay coil 73 via leads 51, 75, contact 74, lead 82, relay 73, lead 76, contact 84, lead 60 and lead 61. Energization of coil 73 pulls in armature 77, closing contacts 78, 79, 80 and 81.

Energization of relay coil 73 completes a motor energizing circuit, but in a manner causing motor 33 to reverse its direction of movement and drive door 24, or 28 as the case may be, toward its closed position across the associated door opening 23 or 27. This closing movement of the door, indicated by arrow 83 in FIG. 5, releases switch 38 which closes contact 58, and physically displaces tray 43 through the associated opening 23 or 27 and onto the associated counter 21, or table 25 as the case may be.

Switches 50 and 42 preferably are time switches having means holding them closed, once they are actuated, for a short period of time sufficient to complete the door opening and closing movements. Alternately, or in addition, relays 55 and 73 can have holding circuits.

In other words, I do not rely upon the force of conveyor 14 to move tray 43 off the conveyor belt, because this force will decrease as the plate is shifted from the conveyor belt. Therefore I provide a positive displacement action against tray 43 by the closing movement of the intercept door member 24 or 28. The tray 43 will be displaced by door 24 or 28 from conveyor belt 14 onto counter 21 or table 25. As the door closes switch 37 is actuated to open contact 84 and interrupt the energizing circuit to door closing relay coil 73.

To facilitate lateral displacement of the tray 43 from belt 14 it is a further feature of my invention that there is provided a tray, dish, plate or boat (all hereafter referred to as a dish) having a generally ellipsoidal shape. Thus dish 43 is elongated, with rounded ends 85 of relatively large curvature and rounded sides 63 of relatively small curvature, the sides and ends blending smoothly to avoid sharp corners which might cause the tray to catch and be held against camming movement. The ellipsoidal shape of the dish greatly facilitates such camming, while providing adequate room for a complete meal. Dish 43 can be compartmented, as indicated at 87, to receive various portions of different food items.

Doors 24 and 28 can have reinforcing wear channels 88 on their inner faces, which channels also can comprise wiring conduits. Curved transfer guides 89 are provided at the junctures between conveyor belts 14 and 15, to turn dishes 43 into lengthwise alinement thereof with belts 14 as they transfer thereto.

Additional circuits can be provided, for energizing motors 33 to close doors 24, 28 from the dispatch station if the dispatcher inadvertently closes the wrong switch 50, and to avoid malfunctioning should a customer close switch 42 while the door is opening or otherwise interfere with the proper functioning and operation of the system. Also, the return flights of conveyors 14 can be used to return dirty dishes to the kitchen area, in which event appropriate access panels, not shown, would be provided.

Therefore, it is seen that my invention fully accomplishes its intended objects. While I have disclosed and described in detail only one embodiment, that has been done by way of illustration only, without thought of limitation.

Having fully disclosed and completely described my invention, and its mode of operation, what I claim as new is:

1. A food service system comprising a food dispatch area, a customer service area, a table at said service area, conveyor means extending from said dispatch area to said service area for conveying dishes of food from the former to the latter, and means for transferring food dishes from said conveyor means to said table including an interceptor member mounted for movement into and out of dish intercepting position relative to said conveyor means, drive means for so moving said interceptor member, first drive control means actuated from said dispatch area for moving said interceptor member into dish intercepting position, and second drive control means responsive to engagement of said interceptor member by a dish on said conveyor means for moving said interceptor member out of said dish intercepting position, said interceptor member moving the intercepted dish from said conveyor means onto said table during its movement out of said dish intercepting position.

2. A food service system comprising a food dispatch area, a customer service area, a table at said service area, conveyor means extending from said dispatch area to said service area for conveying dishes of food from the former to the latter, and means for transferring food dishes from said conveyor means to said table including an interceptor member mounted for movement into and out of dish intercepting position relative to said conveyor means, said interceptor member extending obliquely across said conveyor means when in said intercept position, drive means for so moving said interceptor member, first drive control means actuated from said dispatch area for moving said interceptor member into dish intercepting position, and second drive control means responsive to engagement of said interceptor member by a dish on said conveyor means for moving said interceptor member out of said dish intercepting position, said interceptor member moving the intercepted dish from said conveyor means onto said table during its movement out of said dish intercepting position.

3. A food service system comprising a food dispatch area, a customer service area, a table at said service area, conveyor means extending from said dispatch area to said service area for conveying dishes of food from the former to the latter, and means for transferring food dishes from said conveyor means to said table including an interceptor member mounted for movement into and out of dish intercepting position relative to said conveyor means, drive means for so moving said interceptor member, first drive control means actuated from said dispatch area for moving said interceptor member into dish intercepting position, and second drive control means carried by said interceptor member for engagement by a dish on said conveyor means for moving said interceptor member out of said dish intercepting position, said interceptor member moving the intercepted dish from said conveyor means onto said table during its movement out of said dish intercepting position.

4. A food service system comprising a food dispatch area, a customer service area, a table at said service area, conveyor means extending from said dispatch area to said service area for conveying dishes of food from the former to the latter, and means for transferring food dishes from said conveyor means to said table including an interceptor member mounted for movement into and out of dish intercepting position relative to said conveyor means, drive means for so moving said interceptor member, first control means actuated from said dispatch area for energizing said drive means to move said interceptor member into dish intercepting position, means actuated upon arrival of said member in said intercepting position to de-energize said drive means, second control means responsive to engagement of said interceptor member by a dish on said conveyor means for energizing said drive means to move said interceptor member out of said dish intercepting position, said interceptor member moving the intercepted dish from said conveyor means onto said table during its movement out of said dish intercepting position, and means operable upon predetermined movement of said member out of said intercepting position to de-energize said drive means.

5. A food service system comprising a dispatch area, a customer service area, a table at said service area, conveyor means extending from said dispatch area to said service area for conveying dishes from the former to the latter, an enclosure for said conveyor means in said service area, a service opening through said enclosure adjacent said table, an interceptor door, means mounting said door for movement between a closed position across said service opening and an intercept position across said conveyor means for intercepting dishes being conveyed thereby, drive means for moving said interceptor door between said positions, first drive control means actuated from said dispatch area for moving said door from said closed position to said intercept position, and second drive control means actuated by engagement of a dish on said conveyor means against said door for moving said door from said intercept position to said closed position, said door transferring the intercepted dish from said conveyor means through said service opening onto said tables as it moves from said intercept position to said closed position.

6. A food service system comprising a dispatch area, a customer service area, a table at said service area, conveyor means extending from said dispatch area to said service area for conveying dishes from the former to the latter, an enclosure for said conveyor means in said service area, a service opening through said enclosure adjacent said table, an interceptor door, means mounting said door for movement between a closed position across said service opening and an intercept position obliquely across said conveyor means for intercepting dishes being conveyed thereby and camming the same toward said opening, drive means for moving said interceptor door between said positions, first drive control means actuated from said dispatch area for moving said door from said closed position to said intercept position, and second drive control means actuated by engagement of a dish against said door for moving the same from said intercept position to said closed position, said door transferring an intercepted dish from said conveyor means through said service opening onto said table as it moves from said intercept position to said closed position.

7. A food service system comprising a dispatch area, a customer service area, a table at said service area, conveyor means extending from said dispatch area to said service area for conveying food trays from the former to the latter, an enclosure for said conveyor means in said service area, a service opening through said enclosure adjacent said table, an interceptor door, means mounting said door for movement between a closed position across said service opening and an oblique intercept position across said conveyor means for intercepting trays being conveyed thereby, drive means for moving said interceptor door between said positions, first drive control means actuated from said dispatch area for moving said door from said closed position to said intercept position, and second drive control means carried by said door for actuation by engagement of a tray thereagainst to move said door from said intercept position to said closed position, said door transferring an intercepted tray from said conveyor means through said service opening onto said table as it moves from said intercept position to said closed position.

8. A food service system as set forth in claim 7, together with food service trays of generally ellipsoidal plan view form for engaging said door and being transferred thereby.

9. A food service system comprising a dispatch area, a customer service area, conveyor means extending from said dispatch area to said service area for conveying dishes from the former to the latter, an enclosure for said conveyor means in said service area, a series of service openings through said enclosure at spaced points therealong, a table surface adjacent each opening, an interceptor door for each opening, means mounting said doors for movement between a closed position across the associated service opening and an oblique intercept position across said conveyor means for intercepting dishes being conveyed thereby, drive means for moving said interceptor doors between said positions, first drive control means actuated from said dispatch area for selectively moving said doors from said closed position to said intercept position, and second drive control means actuated by engagement of a dish against a door in said intercept position for moving the same from said intercept position to said closed position, said doors transferring an intercepted dish from said conveyor means through the associated service opening onto said table surface as they move from said intercept position to said closed position.

References Cited by the Examiner
UNITED STATES PATENTS

| | | | |
|---|---|---|---|
| 630,453 | 8/1899 | Fairbanks | 186—1 |
| 1,868,894 | 7/1932 | Glahn | 214—11 |
| 2,011,827 | 8/1935 | Regan | 214—11 |
| 2,516,985 | 8/1950 | Hecht | 198—38 |
| 2,818,161 | 12/1957 | Marsh | 198—38 |

SAMUEL F. COLEMAN, *Primary Examiner.*